(12) United States Patent
Scaramucci

(10) Patent No.: US 9,328,828 B1
(45) Date of Patent: May 3, 2016

(54) SEAT ASSEMBLY FOR VALVE

(71) Applicant: Valve Innovations, LLC, Oklahoma City, OK (US)

(72) Inventor: John P. Scaramucci, Oklahoma City, OK (US)

(73) Assignee: Valve Innovations, LLC, Oklahoma City, OK (US)

( * ) Notice: Subject to any disclaimer, the term of this patent is extended or adjusted under 35 U.S.C. 154(b) by 12 days.

(21) Appl. No.: 14/550,593

(22) Filed: Nov. 21, 2014

(51) Int. Cl.
*F16K 5/06* (2006.01)
(52) U.S. Cl.
CPC ......... *F16K 5/0689* (2013.01); *Y10T 137/4442* (2015.04)
(58) Field of Classification Search
CPC .................... F16K 5/0689; Y10T 137/4442
USPC .................... 251/175; 137/246.22
See application file for complete search history.

(56) References Cited

U.S. PATENT DOCUMENTS

| | | | | |
|---|---|---|---|---|
| 2,788,015 A * | 4/1957 | Scherer | ............... | F16K 5/227 137/246.16 |
| 3,078,865 A * | 2/1963 | Estes | ............... | F16K 3/207 137/246.12 |
| 3,123,078 A * | 3/1964 | Brooks | ............... | F16K 5/227 137/246.22 |
| 3,542,054 A * | 11/1970 | Works | ............... | F16K 5/227 137/246.22 |
| 3,752,178 A * | 8/1973 | Grove | ............... | F16K 5/0673 137/246.22 |
| 3,883,112 A * | 5/1975 | Milleville | ............... | F16K 5/0673 137/246.22 |
| 4,254,793 A * | 3/1981 | Scaramucci | ............... | F16K 5/0673 137/246.22 |
| 7,032,880 B2 * | 4/2006 | Scaramucci | ............... | F16K 5/0678 251/172 |

* cited by examiner

*Primary Examiner* — John Bastianelli
(74) *Attorney, Agent, or Firm* — Dunlap Codding, P.C.

(57) ABSTRACT

A seat assembly for a valve includes an annular seat carrier with an annular sealant groove formed along an inner side. The seat carrier has at least one sealant injection port extending there through from an outer side and intersecting the sealant groove for injecting a sealant into the sealant groove. A sealant distribution member extends along the sealant groove to cooperate with the seat carrier to define an annular sealant flow path along the inner side of the seat carrier. The sealant distribution member has a plurality of openings formed there through to provide a plurality of fluid flow passageways from the sealant groove for injecting the sealant between the seat carrier and the valve member.

14 Claims, 5 Drawing Sheets

SEAT ASSEMBLY FOR VALVE

BACKGROUND

1. Field of the Inventive Concepts

The inventive concepts disclosed herein relate generally to seats for ball valves, and more particularly, but not by way of limitation, to an improved seat assembly for a trunnion mounted ball valve wherein the seat assembly is capable of distributing sealant injected through a sealant injection port.

2. Brief Description of Related Art

In the typical construction of a trunnion mounted ball valve, the ball is machined to provide "trunnions" that are mounted in bearings. The bearing-trunnion combination is intended to support the ball in a stationary position relative to the flow path, but allow rotation of the ball. The ball engages a pair of seat assemblies to form a seal around the ball. The seat assemblies typically include an annular seat carrier and an annular seat positioned in a groove formed in the seat carrier.

Trunnion mounted ball valves are often used in harsh, corrosive environments, such as found in the oil and gas industry. Consequently, the interior faces of the metal portions of the valve body and ball valve member which are exposed to the oil and gas are subject to corrosion, which after an extended period of time without movement of the ball can result in seizure of the ball valve member making it difficult and, at times, impossible to open or close. Also, damage from foreign objects and corrosion of metal parts quite often results in leakage after a frozen valve is opened or closed.

It has long been known to provide valves with a port for introducing a viscous lubricant, commonly referred to in the art as a sealant, between portions of the seal assemblies and the surface of the valve member. While the injection of sealant into a valve often produces desired results, there are other times when a valve remains frozen or continues to leak. One reason for this is that sealant is often injected at one point in a way that sealant is not evenly distributed about the seal assemblies. As such, sealant may be injected into a valve at a location that does not require the sealant, while the location where the sealant is needed does not receive a sufficient amount of sealant.

To this end, a need exists for an improved seat assembly for distributing sealant around the seals. It is to such an improved seat assembly that the inventive concepts disclosed herein are directed.

DETAILED DESCRIPTION OF EXEMPLARY EMBODIMENTS

Figure 1:
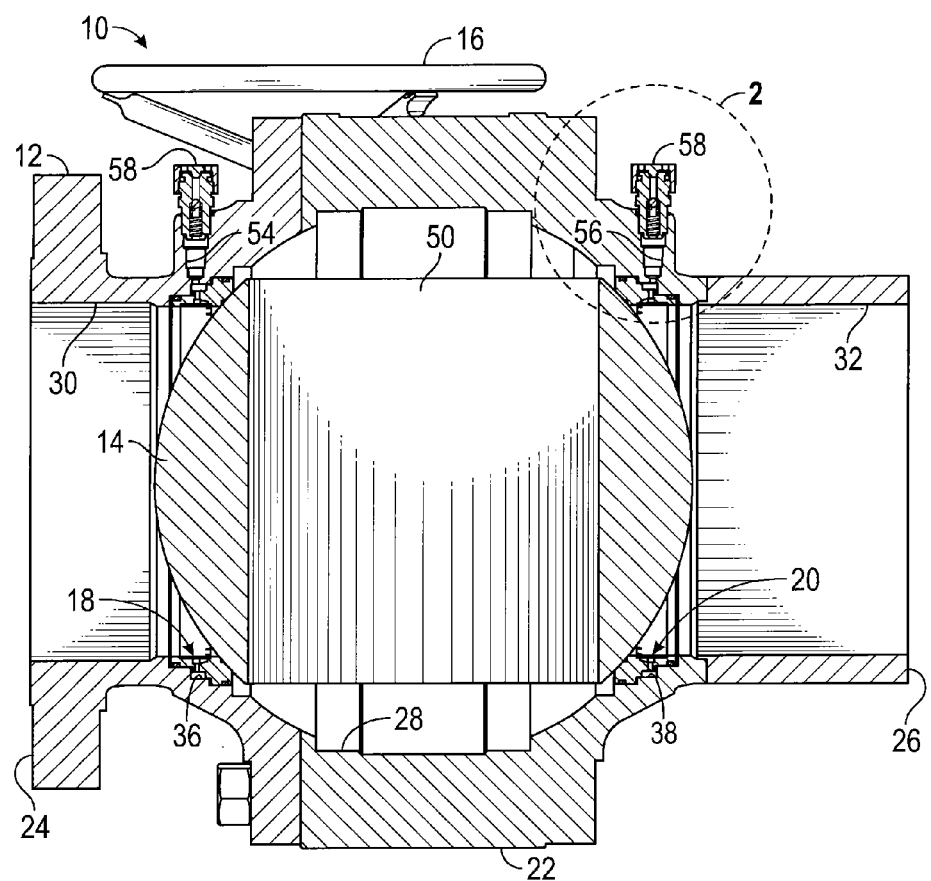
FIG. 1 is a vertical cross section of a valve constructed in accordance with the inventive concepts disclosed herein.

Before explaining at least one embodiment of the inventive concepts in detail, it is to be understood that the inventive concepts disclosed herein are not limited in its application to the details of construction, experiments, exemplary data, and the arrangement of the components set forth in the following description or illustrated in the drawings. The inventive concepts are capable of other embodiments or being practiced or carried out in various ways. Also, it is to be understood that the phraseology and terminology employed herein is for purposes of description and should not be regarded as limiting.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, certain well-known features may not be described in detail to avoid unnecessarily complicating the instant disclosure.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

The term "and combinations thereof" as used herein refers to all permutations or combinations of the listed items preceding the term. For example, "A, B, C, and combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. A person of ordinary skill in the art will understand that typically there is no limit on the number of items or terms in any combination, unless otherwise apparent from the context.

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

The use of the terms "at least one" and "one or more" will be understood to include one as well as any quantity more than one, including but not limited to each of, 2, 3, 4, 5, 10, 15, 20, 30, 40, 50, 100, and all integers and fractions, if applicable, therebetween. The terms "at least one" and "one or more" may extend up to 100 or 1000 or more, depending on the term to which it is attached; in addition, the quantities of 100/1000 are not to be considered limiting, as higher limits may also produce satisfactory results.

Further, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein qualifiers such as "about," "approximately," and "substantially" are intended to signify that the item being qualified is not limited to the exact value specified, but includes some slight variations or deviations therefrom, caused by measuring error, manufacturing tolerances, stress exerted on various parts, wear and tear, and combinations thereof, for example.

Referring now to the drawings, and more particularly to FIG. 1, shown therein is a valve 10 constructed in accordance with the inventive concepts disclosed herein. The valve 10 includes a body assembly 12, a valve member 14 disposed in the body assembly 12 for rotation between an open position (not shown) and a closed position (FIG. 1), and a stem (not shown) to which a handle 16 is connected for rotating the valve member 14 between the open position and closed position. The valve 10 further includes a pair of seat assemblies 18 and 20 for forming a seal between the body assembly 12 and the valve member 14.

The body assembly 12, as shown in FIG. 1, includes a body 22, a first end adaptor 24 illustrated as being integrally formed with the body 22 as one piece, and a second end adapter 26 connected to the opposing end of the body 22. It will be appreciated by those of ordinary skill in the art that the body assembly 12 may be fabricated in three portions where each of the end adaptors 24 and 26 are connected to the body 22. Further, the end adapters 24 and 26 may be provided in a variety of forms, such as flanged (e.g., end adapter 24), welded (e.g., end adapter 26), and threaded.

The body assembly 12 has a centrally disposed valve chamber 28, and an inlet passage 30 and an outlet passage 32 in communication with the valve chamber 28 to form a flow passageway through the body assembly 12. A first seat pocket 36 is formed about the inlet passage 30, and a second seat pocket 38 is formed about the outlet passage 32. The first seat pocket 36 is adapted to receive the seat assembly 18, and the second seat pocket 38 is adapted to receive the seat assembly 20.

The valve member 14 is mounted within the valve chamber 28 for rotation about an axis between the opened position and the closed position wherein the valve member 14 is rotated substantially 90 degrees from the opened position to the closed position. The valve member 14 has a central bore 50 which aligns with the inlet passage 30 and the outlet passage 32 in the open position of the valve member 14 to permit the passage of fluid through the valve 10 when the valve member 14 is in the open position thereof. In the closed position of the valve member 14, the seat assemblies 18 and 20 engage the exterior surface of the valve member 14 and internal surfaces of the body assembly 12 to form fluid tight seals which disrupt fluid communication between the inlet passage 30 and the outlet passage 32.

The body assembly 12 has at least one sealant injection port extending there through to permit a sealant to be injected into the body assembly 12. More specifically, the body assembly 12 is shown to include a first sealant injection port 54 extending through the first end adapter 24 and intersecting the first seat pocket 36 and a second sealant injection port 56 extending through the second end adapter 26 and intersecting the second seat pocket 38. Each of the first seal injection port 54 and the second sealant injection port 56 may be provided with a suitable one-way injection valve, such as the injection valve 58.

In one embodiment, the seat assembly 20 is identical to the seat assembly 18 and is positioned in the second seat pocket 38 in the same manner that the seat assembly 18 is positioned in the first seat pocket 36. Accordingly, it is not believed necessary to describe the construction and positioning of both seat assemblies 18 and 20. Rather, it will suffice to describe the construction and positioning of the seat assembly 20 for the purposes of the present disclosure.

Figure 2:
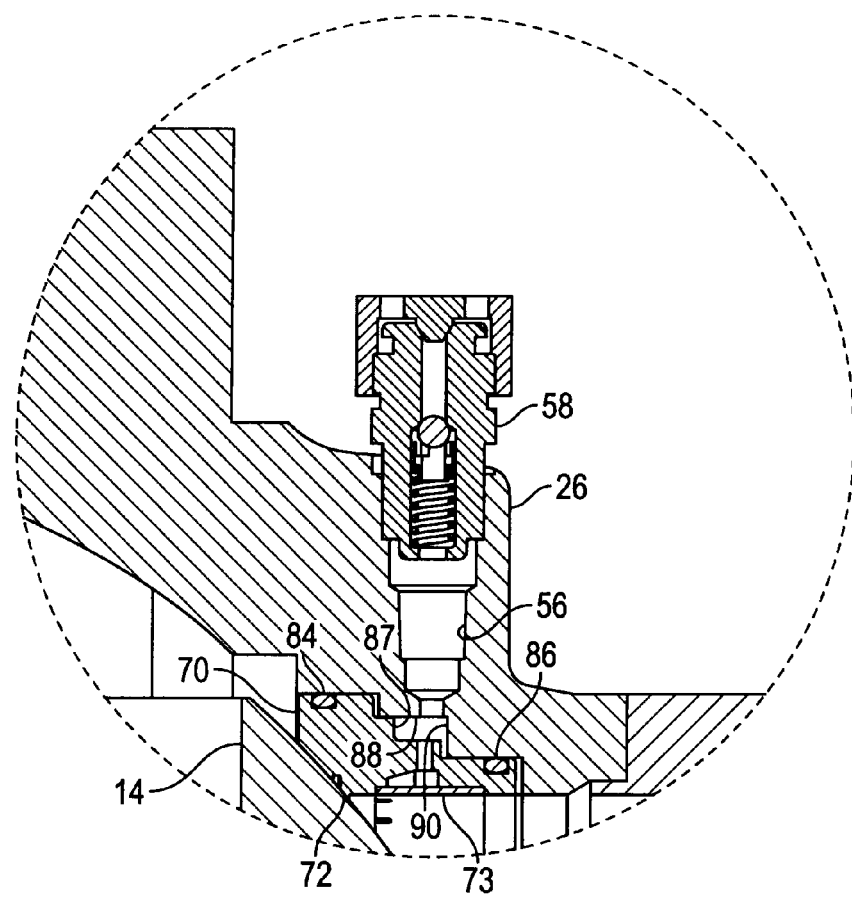
FIG. 2 is an enlarged cross-sectional view of a portion of FIG. 1 illustrating a seat assembly constructed in accordance with the inventive concepts disclosed herein in conjunction with a sealant injection port.

Referring now to FIGS. 2-9, the seat assembly 20 includes a seat carrier 70, a seat 72 (FIG. 2), and a sealant distribution member 73. The seat carrier 70 is annularly shaped and formed of a metal, such as steel or stainless steel. The seat carrier 70 has an inner side 74, an outer side 76, an inward facing end 78, and an outward facing end 80. The outer side 76 is illustrated as being provided with an outer groove 82 dimensioned to receive a seal member 84 (FIG. 2) and an outer groove 85 dimensioned to receive a seal member 86 (FIG. 2). A portion of the outer side 76 of the seat carrier 70 may also define a shoulder 87 which defines an annular space 88 and permits a spring (not shown) to be positioned between the shoulder 87 and an opposing surface 90 (FIG. 2) of the body assembly 12 to bias the seat assembly 20 toward the valve member 14. The inner facing end 78 of the seat carrier 70 may be provided with a frusto-conical surface 92 defining the seat 72. It should be appreciated that references to "inner" and "outer" are made with respect to the longitudinal flow axis, and references to "inward facing" and "outward facing" are made with respect to the valve member 14.

It will be appreciated that the seat 72 may vary widely in form and construction. By way of example, the seat 72 may include a seal ring constructed of an elastomeric material, such as polyethylene, polypropylene, nylon or acetal, depending on the differences in deflection strength desired.

Figure 3:
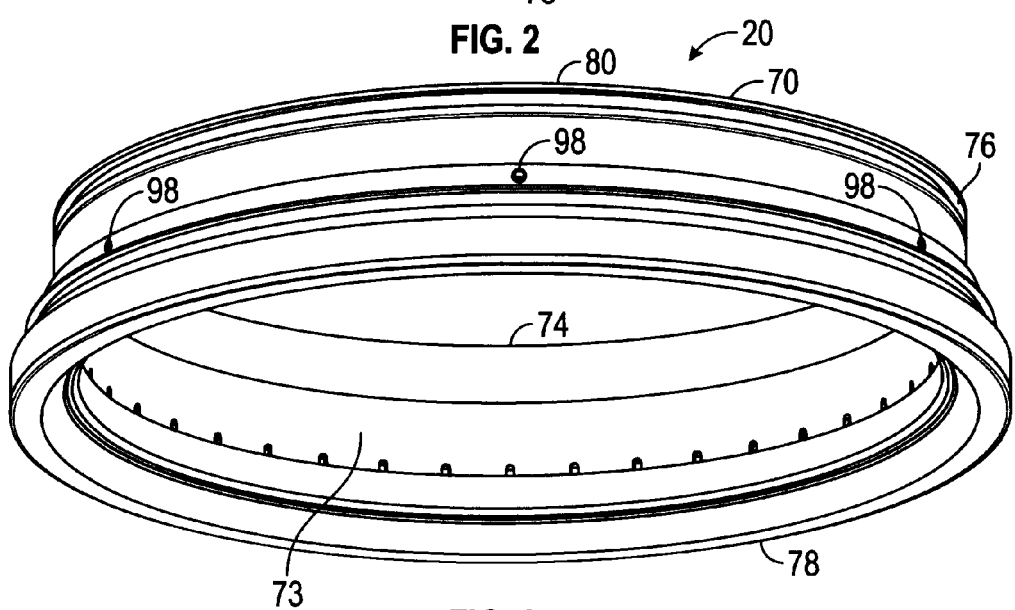
FIG. 3 is a perspective view of the seat assembly.
Figure 4:
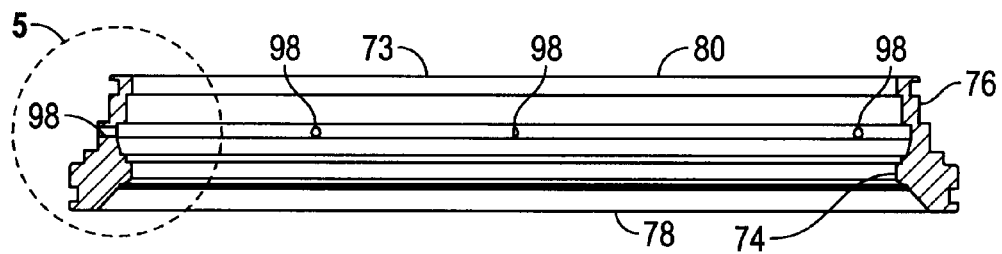
FIG. 4 is a cross sectional view of a seat carrier.
Figure 5:
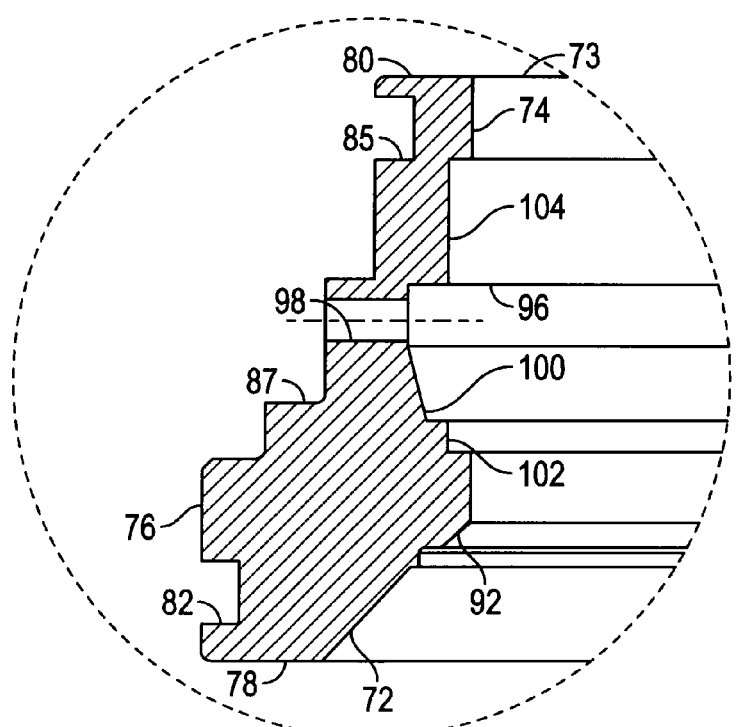
FIG. 5 is an enlarged cross-sectional view of the seat carrier of FIG. 4.

The seat carrier 70 is further provided with an annular sealant groove 96 formed along the inner side 74 thereof and at least one sealant injection port 98 extending through the seat carrier 70 from the outer side 76 and intersecting the sealant groove 96. The sealant injection port 98 is in fluid communication with the sealant injection port 56 of the body assembly 12 via the annular space 88 (FIG. 2) for injecting a sealant into the sealant groove 96. In one embodiment as best shown in FIGS. 3 and 4, the seat carrier 70 may be provided with a plurality of sealant injections ports 98 which are in fluid communication with the sealant injection port 56 of the seat carrier 70 via the annular space 88.

The sealant groove 96 may be formed in a variety of shapes and sizes. In one embodiment, the sealant groove 96 may have a tapered portion 100 that tapers in the direction of the frusto-conical surface 92 of the seat carrier 70. The inner side 74 of the seat carrier 70 may be provided with a first recessed shoulder 102 and a second recessed shoulder 104 positioned on opposing sides of the sealant groove 96 for supporting the sealant distribution member 73 over the sealant groove 96 in a manner to be discussed below.

Referring now to FIGS. 6-9, the sealant distribution member 73 is configured to extend along the sealant groove 96 to cooperate with the seat carrier 70 to define a sealant flow path along the inner side 74 of the seat carrier 70. In one embodiment, the sealant distribution member 73 is ring-shaped and has a width such that the sealant distribution member 73 is supported by the first and second recessed shoulders 102 and 104. In addition, the sealant distribution member 73 may have a thickness such that the sealant distribution member 73 is substantially flush with the inner side 74 of the seat carrier 70 when the sealant distribution member 73 is supported by the first and second recessed shoulders 102 and 104.

The sealant distribution member 73 has a plurality of openings 108 formed therethrough to provide a plurality of fluid flow passageways from the sealant groove 96 for injecting the sealant between the seat carrier 70 and the valve member 14. In one embodiment, the openings 108 may be equally spaced along one edge of the sealant distribution member 73 in a way that the openings 108 are positioned adjacent to the distal end of the tapered portion 100 of the sealant groove 96 when the sealant distribution member 73 is positioned over the sealant groove 96. It will be appreciated, however, that the number, position, size, shape, and pattern of the openings may be varied to produce a desired distribution pattern.

Figure 6:
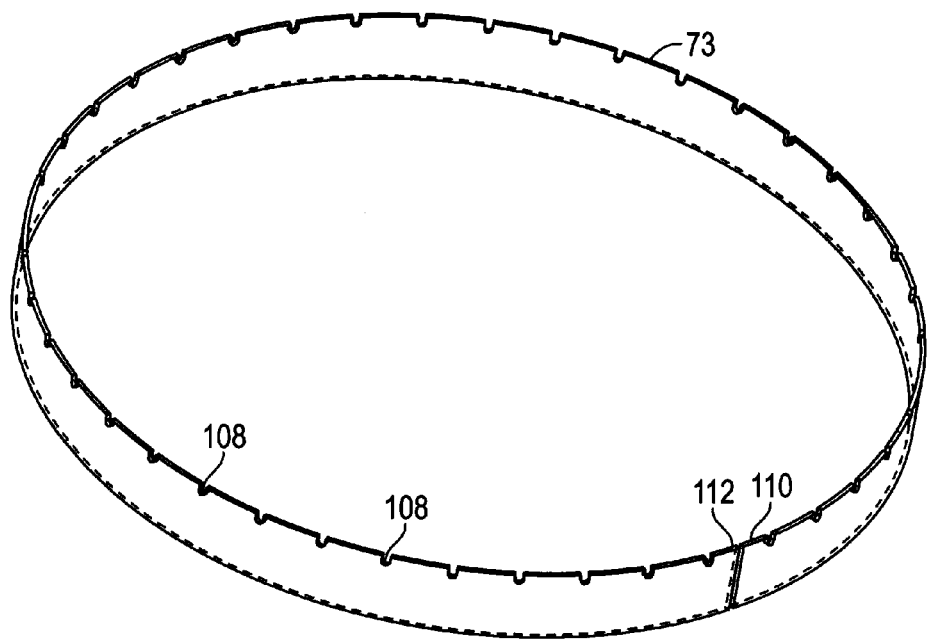
FIG. 6 is a perspective view of a sealant distribution ring.
Figure 7:
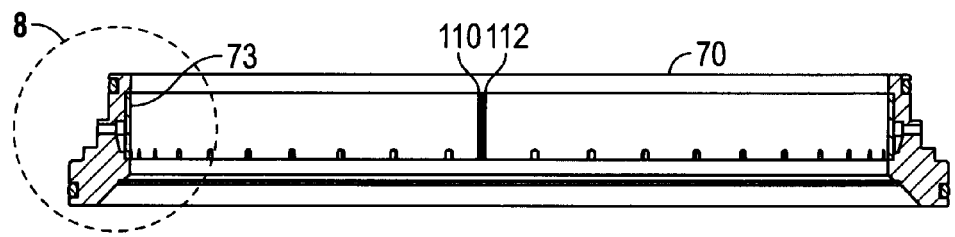
FIG. 7 is a cross sectional view of the seat assembly.
Figure 8:
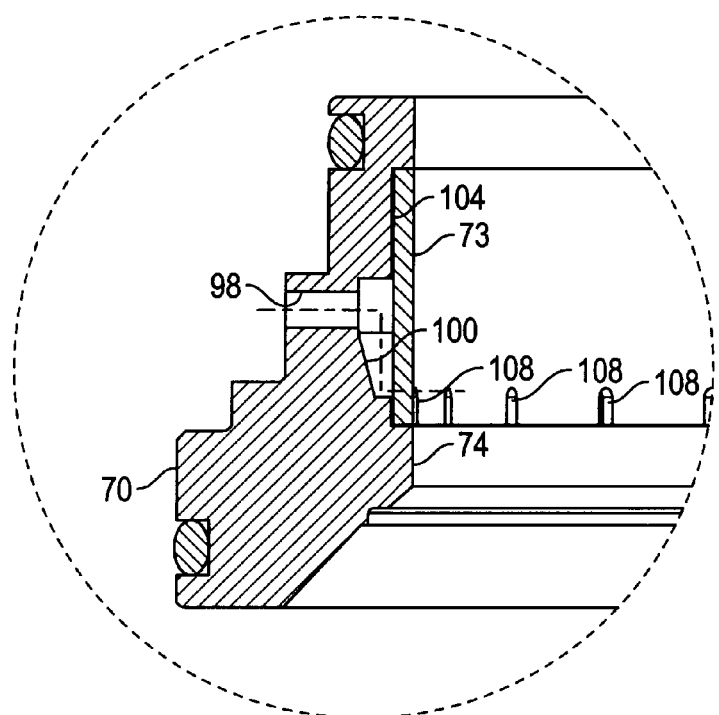
FIG. 8 an enlarged cross-sectional view of the seat assembly of FIG. 7.

The sealant distribution member 73 may be fabricated from any suitable corrosion resistant material, such as stainless steel. In one embodiment, the sealant distribution member 73 may be formed from a strip of material having a first end 110 and a second end 112 (FIGS. 6 and 7). The sealant distribution member 73 may be resilient whereby the sealant distribution member 73 is capable of being compressed to facilitate assembly with the seat carrier 70. More specifically, in one embodiment the sealant distribution member 73 may be compressed so that the ends 110 and 112 overlap one another to permit the sealant distribution member 73 to be passed into the seat carrier 73 and positioned on the first recessed shoulder 102 and the second recessed shoulder 104. The resiliency of the sealant distribution member 73 permits the sealant distribution member 73 to recover its shape after being compressed. The strip of material is provided with a length such that the first end 110 and the second end 112 are caused to abut or nearly abut one another, as illustrated in FIG. 7. The first end 110 and the second 112 may then be secured to one another by any suitable means, such as by welding, thereby securing the sealant distribution member 73 to the seat carrier 70.

In use, a selected sealant may be injected between the valve member 14 and the seat carrier 70 of the seat assembly 20, the valve member 14 and the seat assembly of the seat assembly 18, or between both the valve member 14 and the seat assembly 70 of the seat assembly 20 and between the seat assembly of the seat assembly 18. By way of example, the sealant may be injected into the injection valve 58 so as to cause the sealant to pass into the annular space 88. From there, the sealant flows into and through the sealant injection ports 98 and into sealant groove 96. The sealant then flows through the sealant groove 96 and out through the openings 108 in a way that the sealant is evenly distributed between the seat carrier 70 and the valve member 14.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A valve, comprising;
   a valve member;
   an annular seat carrier having an inner side, an outer side, an inward facing side, and an outward facing side, the seat carrier having an annular sealant groove formed along the inner side of the seat carrier, the seat carrier having at least one sealant injection port extending through the seat carrier from the outer side of the seat carrier and intersecting the sealant groove for injecting a sealant into the sealant groove; and
   a sealant distribution member extending along the sealant groove of the seat carrier to cooperate with the seat carrier to define an annular sealant flow path along the inner side of the seat carrier, the sealant distribution member having a plurality of openings formed there through to provide a plurality of fluid flow passageways from the sealant groove for injecting the sealant between the seat carrier and the valve member.

2. The valve of claim 1, wherein the inner side of the seat carrier has a first recessed shoulder and a second recessed shoulder positioned on opposing sides of the sealant groove, and wherein the sealant distribution member is supported by the first recessed shoulder and the second recessed shoulder.

3. The valve of claim 2, wherein the sealant distribution member is ring shaped and substantially flush with the inner side of the seat carrier.

4. The valve of claim 1, wherein the openings through the sealant distribution member are equally spaced along a length of the sealant distribution member.

5. The valve of claim 4, wherein openings of the sealant distribution member are formed along at least one edge of the sealant distribution member.

6. The valve of claim 1, wherein the seat carrier is provided with a plurality of sealant injection ports.

7. The valve of claim 1, wherein the sealant groove of the seat carrier has a tapered portion with a proximal end and a distal end, and wherein the openings of the sealant distribution member are positioned adjacent the distal end of the tapered portion of the sealant groove.

8. A valve, comprising:
   a body assembly having a valve chamber and an inlet passage and an outlet passage in communication with the valve chamber, the body assembly further having at least one sealant injection port;
   a valve member positioned in the valve chamber and movable between an open position and a closed position, the valve member having a flow passage formed therethrough for providing fluid communication between the inlet passage and the outlet passage of the valve body when the valve member is in the open position; and
   a seat assembly extending about the inlet passage and engaging the valve member, the seat assembly comprising:
      an annular seat carrier having an inner side, an outer side, an inward facing side, and an outward facing side, the seat carrier having an annular sealant groove formed along the inner side of the seat carrier, the seat carrier having at least one sealant injection port extending through the seat carrier from the outer side of the seat carrier and intersecting the sealant groove, the sealant injection port of the seat carrier being in fluid communication with the sealant injection port of the valve body for injecting a sealant into the sealant groove; and
      a sealant distribution member extending along the sealant groove of the seat carrier to cooperate with the seat carrier to define an annular sealant flow path along the inner side of the seat carrier, the sealant distribution member having a plurality of openings formed there through to provide a plurality of fluid flow passageways from the sealant groove for injecting the sealant between the seat carrier and the valve member.

9. The valve of claim 8, wherein the inner side of the seat carrier has a first recessed shoulder and a second recessed shoulder positioned on opposing sides of the sealant groove, and wherein the sealant distribution member is supported by the first recessed shoulder and the second recessed shoulder.

10. The valve of claim 9, wherein the sealant distribution member is ring shaped and substantially flush with the inner side of the seat carrier.

11. The valve of claim 8, wherein the openings through the sealant distribution member are equally spaced along a length of the sealant distribution member.

12. The valve of claim 11, wherein openings of the sealant distribution member are formed along at least one edge of the sealant distribution member.

13. The valve of claim 8, wherein the seat carrier is provided with a plurality of sealant injection ports, and wherein each of the sealant injection ports of the seat carrier are in fluid communication with the sealant injection port of the body assembly.

14. The valve of claim 1, wherein the sealant groove of the seat carrier has a tapered portion with a proximal end and a distal end, and wherein the openings of the sealant distribution member are positioned adjacent the distal end of the tapered portion of the sealant groove.

\* \* \* \* \*